United States Patent [19]

Reinke

[11] Patent Number: 5,260,539
[45] Date of Patent: Nov. 9, 1993

[54] METHOD AND APPARATUS FOR MAKING A PRINTING SCREEN

[75] Inventor: George W. Reinke, Reno, Nev.

[73] Assignee: Screen Printing Systems, Inc., Sparks, Nev.

[21] Appl. No.: 932,070

[22] Filed: Aug. 20, 1992

Related U.S. Application Data

[63] Continuation-in-part of Ser. No. 690,658, Apr. 24, 1991.

[51] Int. Cl.$^5$ ............... B21F 15/08; B23K 11/00
[52] U.S. Cl. ................................................ 219/56
[58] Field of Search ........................ 219/56, 57, 58

[56] References Cited

U.S. PATENT DOCUMENTS

| | | | |
|---|---|---|---|
| 2,645,702 | 7/1953 | Harmon, Jr. | 219/56 |
| 2,723,330 | 11/1955 | Holroyd et al. | 219/57 |
| 3,155,034 | 11/1964 | Reinke | 101/120 |
| 3,370,150 | 2/1968 | Nordgren | 219/56 |
| 3,482,300 | 12/1969 | Reinke | 101/128.4 |
| 3,678,971 | 7/1972 | Nordgren | 219/56 |
| 3,696,741 | 10/1972 | Reinke | 101/128.21 |
| 3,759,799 | 9/1973 | Reinke | 101/127 |
| 3,759,800 | 9/1973 | Reinke | 101/127 |
| 3,920,170 | 11/1975 | Colburn et al. | 219/56 |
| 4,319,112 | 3/1982 | Connolly | 219/56 |
| 4,742,872 | 5/1988 | Geske | 29/163.7 |
| 4,911,209 | 3/1990 | Smith et al. | 219/56 |

Primary Examiner—Geoffrey S. Evans
Attorney, Agent, or Firm—Lloyd L. Zickert

[57] ABSTRACT

A method and apparatus for making a true butt-welded cylindrical printing screen for a rotary screen printing press, wherein the screen material is rigidized woven metal screen. The method of making the cylindrical screen of the invention includes the steps of cutting a rectangular piece of rigidized woven metal screen material of a size to form a screen of a predetermined size, forming the piece into a cylindrical shape so that two edges are abutting each other to form a butt seam such that sufficient metal will be present to provide a proper weld, mounting the screen on a support bar so that the abutting edges line up with a stationary electrode carried by the support bar, where the electrode includes a tip of narrow width in the range of 0.010 to 0.040 inches, and running an upper electrode along the other side of the butt seam to resistance weld the two edges of the screen material together and form a butt weld. The apparatus includes a support bar for holding the stationary electrode, means for mounting and holding the screen material edges together on the support bar in alignment with a thin elongated electrode carried by the support bar, and means for driving an upper electrode along the butt seam to effect the welding of the edges together.

20 Claims, 4 Drawing Sheets

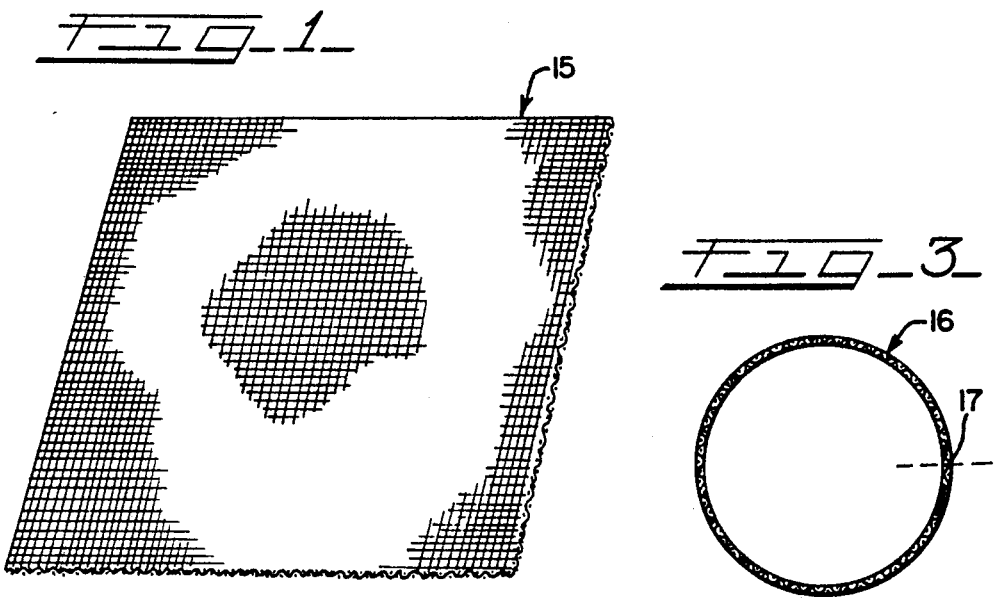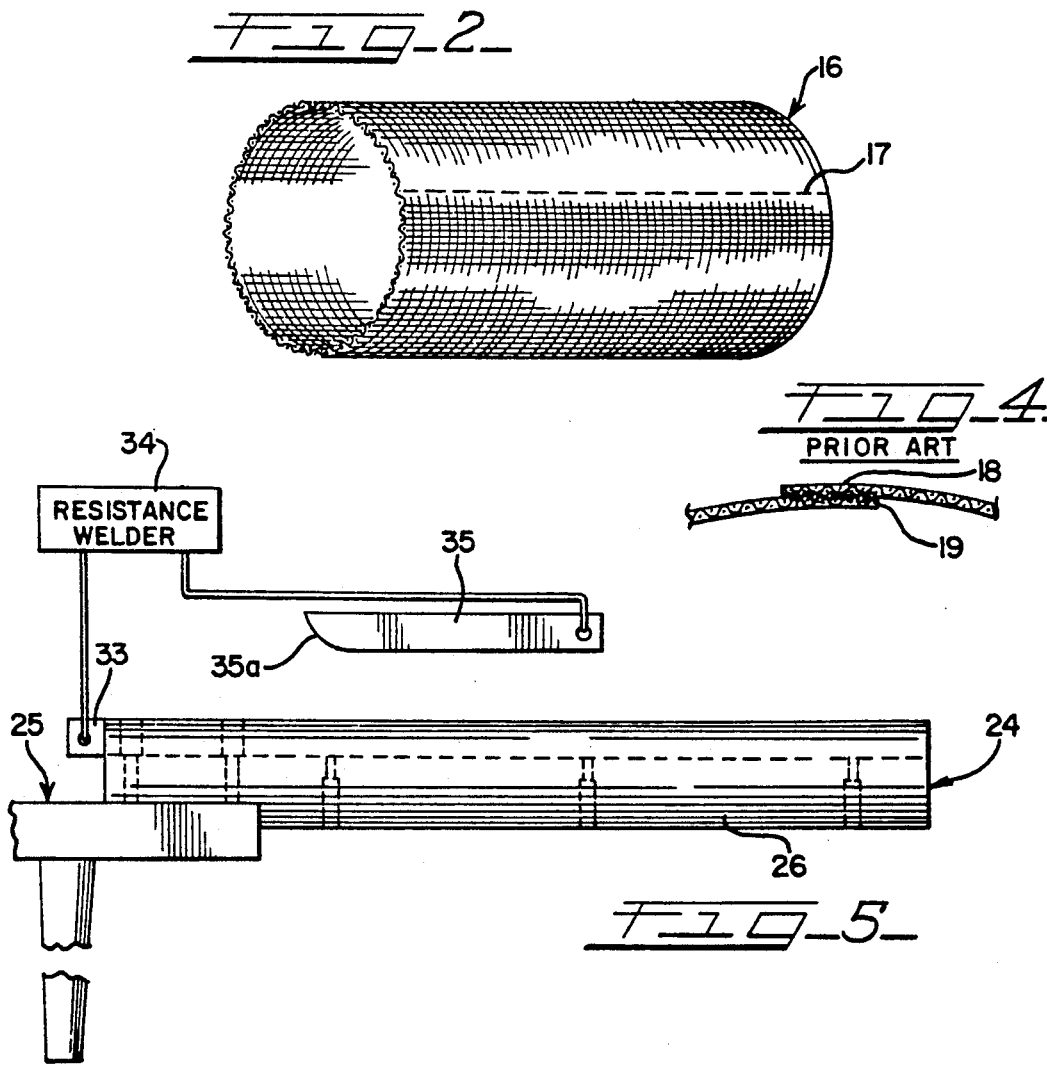

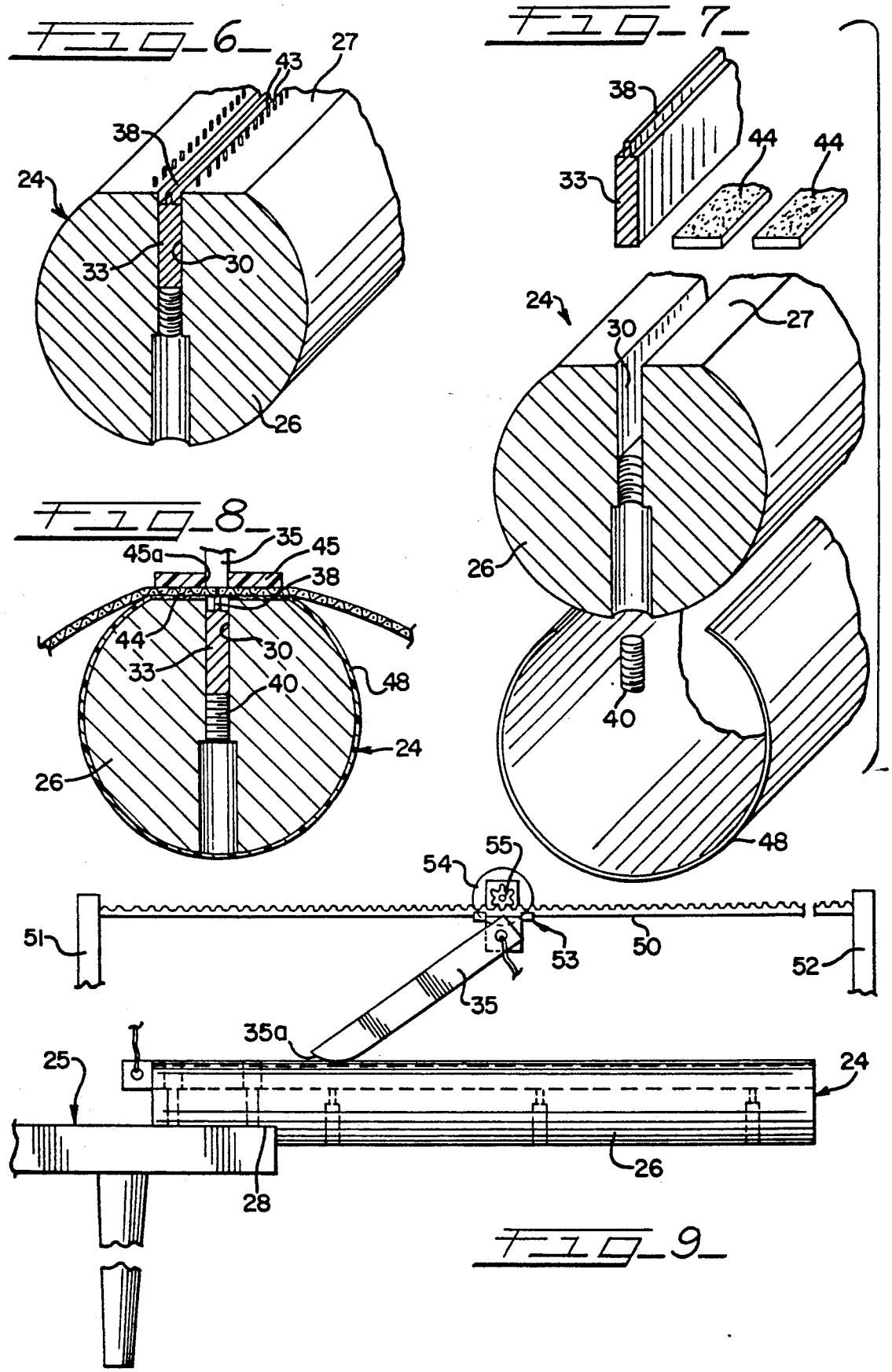

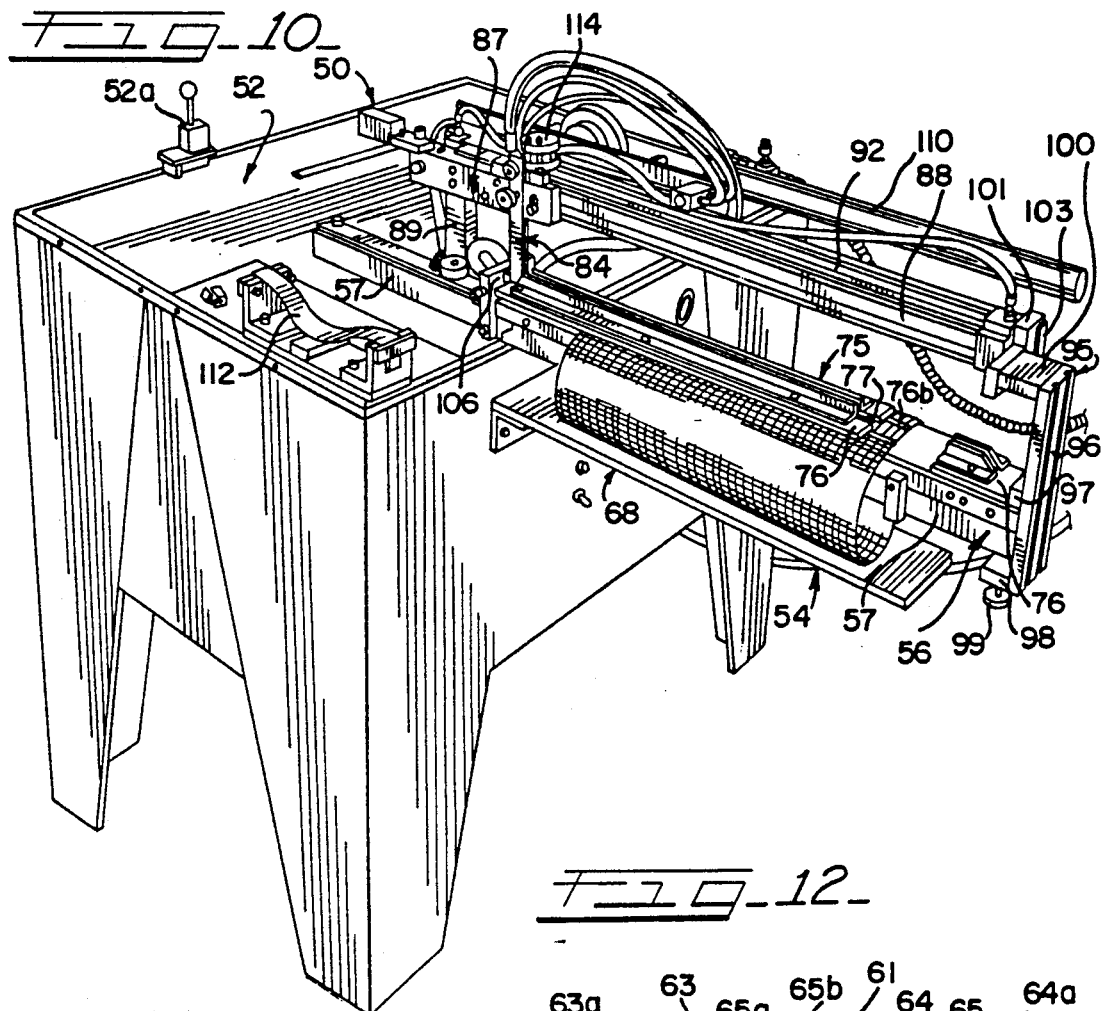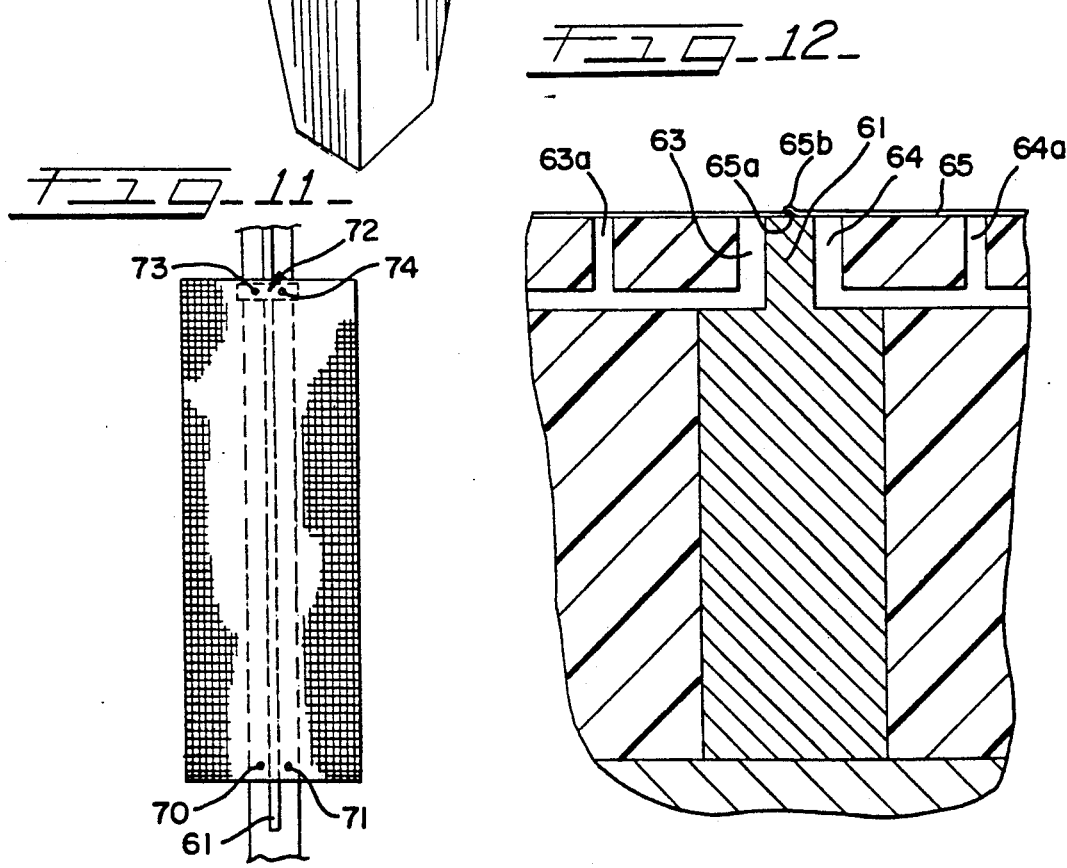

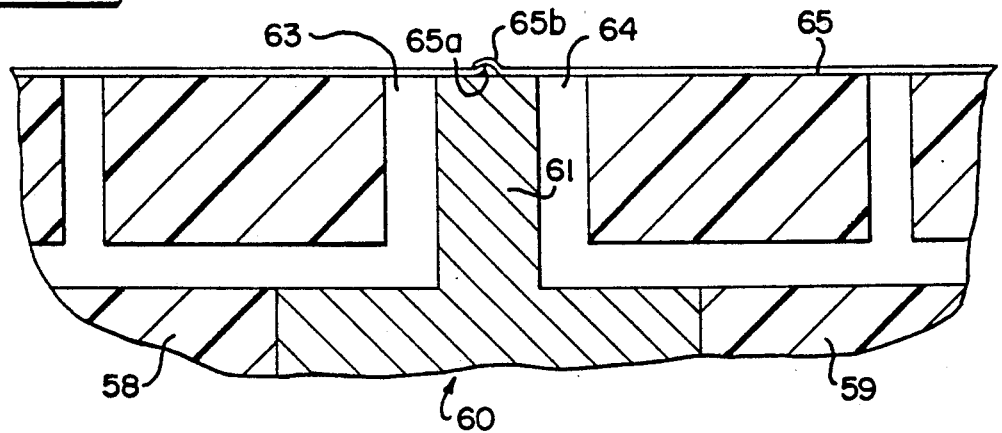
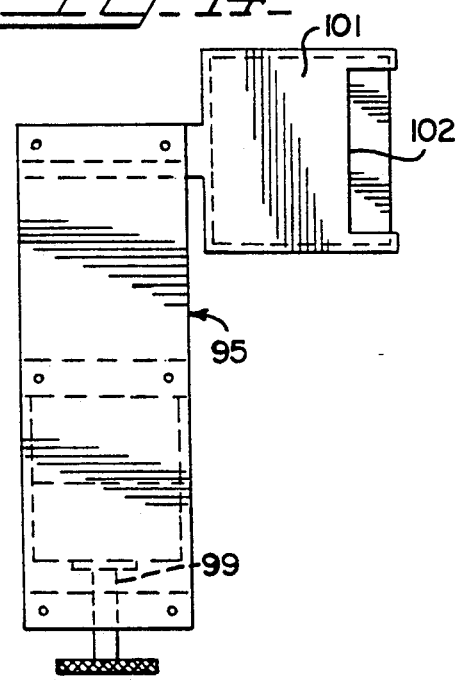
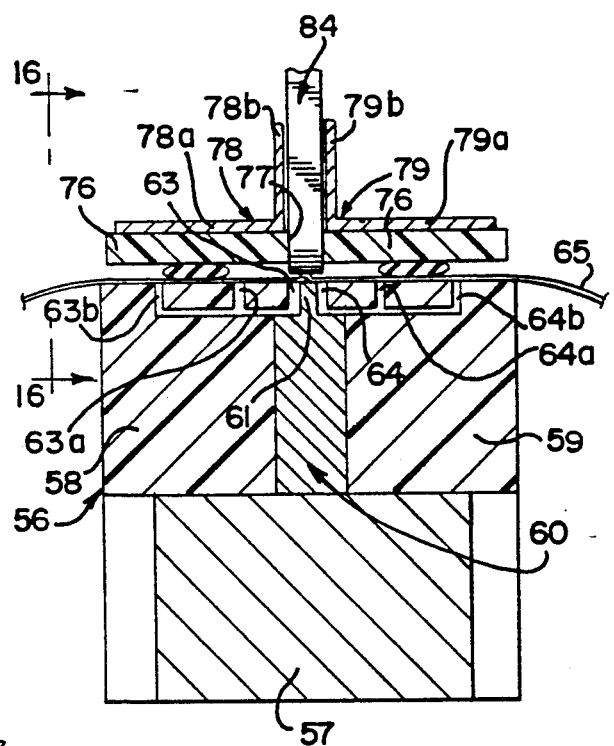
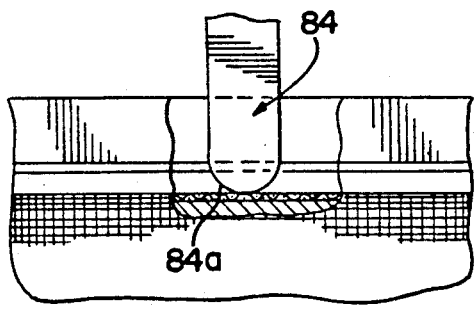

METHOD AND APPARATUS FOR MAKING A PRINTING SCREEN

This application is a continuation-in-part application of my co-pending application Ser. No. 690,658, filed Apr. 24, 1991.

DESCRIPTION

This invention relates in general to screen printing, and more particularly to an improved rotary printing screen and a method and apparatus for making the printing screen, and still more particularly to an improved printing screen of the type used on rotary printing presses wherein the screen takes a cylindrical form and is generally driven in continuous motion in one direction, and still more particularly to an improved rotary printing screen with an improved seam welded screen, and still more particularly to a method and apparatus for making an improved cylindrical printing screen of rigidized, woven metal screen material.

BACKGROUND OF THE INVENTION

Rotary screen printing presses are well known, such as the one disclosed and illustrated in U.S. Pat. No. 3,155,034. Such presses utilize a printing screen that is cylindrical in form such as those illustrated in U.S. Pat. Nos. 3,482,300; 3,696,741; 3,759,799; and 3,759,800. The preferred types of metal screens are the rigidized woven metal screen as particularly disclosed in my U.S. Pat. No. 3,482,300, or the all-metal self-supporting screen disclosed in my U.S. Pat. No. 3,759,799. One of the advantages of such screens is that they can be made in a variety of screen mesh counts such as from a fine screen of 400 mesh to a coarse screen of 32 mesh having thread diameters of 0.86 to 1 mil in order to satisfy a variety of screen printing applications.

With respect to making a cylindrical printing screen from metal woven mesh screen material of the type disclosed in U.S. Pat. No. 3,482,300 and U.S. Pat. No. 3,759,799, a screen section is cut and cylindrically shaped with edges overlapped and usually bonded together with adhesive such as an epoxy. The overlapped seam can also be welded by a resistance welder, but in either case, the overlapped seam defines a rough area along the screen over which the squeegee of the printing press has to jump on each revolution of the screen. The faster the printing speed the greater the jump because the blade has some flexibility. The time the blade jumps or is in the jump or spaced from the screen constitutes the recovery time for the blade to return to the screen, and an increase in recovery time relates to the distance or the length of the jump, and the distance becomes longer. Accordingly, a specified gap size along the screen where it will not print is produced depending on the speed. With the advent of faster and faster rotary screen printing presses and the demand for faster printing speeds, the specified gap size becomes a major problem.

SUMMARY OF THE INVENTION

The present invention obviates the problems encountered in woven metal screens for rotary screen printing presses by providing a method and apparatus for making a cylindrical screen having a true butt weld so as to avoid the heretofore known jump over the squeegee and essentially permit printing along substantially the full 360 degrees of the printing screen, thereby allowing the screen to be used efficiently on high-speed printing presses. Such a true butt weld has not been heretofore possible.

The method of making the improved woven metal screen of the invention includes precisely cutting and shaping a rectangular section of metal woven screen of the types in the above U.S. Pat. No. 3,482,300 or U.S. Pat. No. 3,759,799 patents into a cylindrical form, mounting the screen on a fixture in the form of a support arm having an elongated electrode of a resistance welding machine where the electrode tip is very thin and on the order of 0.010 to 0.040 inches, and so the seam at the abutting edges of the screen line up with the electrode tip, and running an upper electrode along the other side of the screen along the edges to weld the edges together and provide a very fine welded butt seam. The screen is carefully cut parallel or on a bias or angle to the filaments or threads by a sheet-metal shear, a razor blade, or other suitable cutting device so that the edges to be welded are straight and square with the other edges. Further, the edges to be welded are pushed tightly together such that there is no gap between the edges, and so they effectively "tent" to provide the necessary metal for the weld. It is to be understood that "rigidized" woven metal screen material as used herein includes the screen material of either of the U.S. Pat. No. 3,482,300 or U.S. Pat. No. 3,759,799 patents.

A further and preferred method of making the printing screen is to cut the edges of the screen material to be welded together such that one edge is cut face up and the other edge is cut face down so that slight curved edges or curls are formed. When the edges are brought together and slightly overlapped, sufficient metal is provided to supply the weld and create a very fine seam with no overlap. Thus, even though the edges are slightly overlapped during the welding operation, which overlap merely supplies the metal for the weld, the weld produced will be like a butt weld which minimizes the thickness of the screen in the vicinity of the weld. The heretofore well known overlap weld is twice the wire thickness, plus the adhesive material, resulting in a thickness of ten to 25 percent more than the thickness of one layer of wire mesh, depending on mesh selected. Thus, jump over the squeegee is rendered thin enough to not be noticeable.

The apparatus includes an elongated support arm formed to receive an elongated electrode of the resistance welding machine having the very thin tip above mentioned, means for mounting and holding the screen in place on the support arm so that the abutting or slightly overlapping edges align with the tip, insulating the support arm electrically from the screen, and running an upper electrode of the welder along and on the other side of the butt seam to weld the edges of the screen together.

It is therefore an object of the present invention to provide a method of making an improved printing screen for a rotary press and apparatus for making the screen, wherein the screen is produced from a sheet of screen material having edges welded together such that squeegee jump is minimal, thereby permitting higher speed printing along substantially the entire screen.

Another object of the present invention is to provide a new and improved rigidized, woven metal printing screen for a rotary printing press having a welded seam that essentially eliminates squeegee jump and permits printing closer to the seam.

Still another object of the invention is in the provision of a method and apparatus for making an improved rigidized, woven metal printing screen for a rotary printing press that includes butt welding of the edges of a sheet of screen material together that has been shaped cylindrically, whereby the screen is smooth at the weld seam so it can be used efficiently on high-speed printing presses.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a perspective view of a section or sheet of rigidized, woven metal screen material to be shaped into a cylindrical screen;

FIG. 2 is a perspective view of a completed cylindrical screen having edges butt welded together according to the invention;

FIG. 3 is an end view of the screen of FIG. 2;

FIG. 4 is an enlarged fragmentary sectional view of an overlap seam of the type that has been well known for use in making cylindrical screens for rotary screen printing presses and illustrating the bump or irregular surface at the seam;

FIG. 5 is an elevational partly schematic view of the apparatus of the invention for making the improved screen;

FIG. 6 is an end perspective view of the support bar shown in FIG. 5 and illustrating details and also showing a cross section taken through the support bar at a set screw location and pins for mounting the screen material on the bar for welding;

FIG. 7 is an exploded view of the support bar showing another embodiment where double-stick adhesive tape is utilized for mounting the screen material on the support bar;

FIG. 8 is a cross-sectional view taken through the support bar and illustrating the screen material in mounted position on the support bar and the arrangement of the electrodes;

FIG. 9 is a view similar to FIG. 5 but also showing a device for driving the upper electrode along the support bar during the welding procedure;

FIG. 10 is a perspective view of a further embodiment of the invention for making the printing screen of the present invention and illustrating a machine in perspective and with a sheet of screen material formed in cylindrical shape mounted on the machine for welding along the seam with some parts broken away to show underlying parts;

FIG. 11 is a top plan view of the screen material mounted on the machine to illustrate how the screen material is held in place by pins on the support arm of the welding machine;

FIG. 12 is an enlarged cross-sectional view taken through the arm of the machine to illustrate the size of the lower anvil or electrode on which the two edges of the screen material are placed during the welding operation;

FIG. 13 is an even greater enlarged fragmentary view like FIG. 12 to clearly show the overlapping of the edges of the screen material and that they include an upward curl and a downward curl;

FIG. 14 is an end view of the machine supporting arm which shows the removable clamp that is placed between the support arm and the pneumatic cylinder that drives the wand or upper electrode;

FIG. 15 is another transverse sectional view, somewhat schematic, taken through the support arm of the welding machine and showing the clamp for securing the screen material to the support arm and the wand or upper electrode engaging the upper side of the seam; and FIG. 16 is an enlarged fragmentary side elevational view of FIG. 15 showing the wand engaging the screen material at the seam during the welding process.

DESCRIPTION OF THE INVENTION

The improved printing screen of the invention and the method and apparatus for making the printing screen utilizes preferably self-supporting printing screen material of the type disclosed in the above U.S. Pat. No. 3,482,300 or U.S. Pat. No. 3,759,799. For that purpose the disclosures of these patents are incorporated by reference. Also incorporated by reference is disclosure of U.S. Pat. No. 3,155,034 as to a type of printing press on which cylindrical screens of the type made in accordance with the invention are used. More particularly, the screen material may be Phosphor bronze or stainless steel of the "taffeta" weave type. The "taffeta" weave relates to a screen material where wires extend normal to each other and cross over and under each other so that wires extending in one direction intersectingly engage wires extending normal thereto, and thereby define openings of a particular size to the screen. It is the mesh openings not blocked by the printing design through which ink is squeegeed onto a substrate to produce a printed product. The screen may be of any size mesh count such as a fine 400 mesh with a thread diameter of 0.001 inch (1 mill) to a coarse 32 mesh and having a thread diameter of as much as 0.008 inch (8 mills). The chosen screen size will depend upon the particular printing application.

It has not been heretofore possible to utilize that rigidized screen in rotary screen printing presses except to make the screen by use of an overlap seam as disclosed in FIG. 4. Particularly, no equipment and method have been heretofore available to make a true butt weld. Usually, the overlap seam is held together by an adhesive such as an epoxy which effectively blocks out that part of the screen from being used for printing purposes. Additionally, a bump or not-smooth portion is provided along the screen, which, when passing over the screen, causes the squeegee to jump because of its resiliency and define a gap along the screen where printing cannot be accomplished. The higher the printing speed, the greater the gap, and therefore the present invention solves this problem by providing a true butt-welded seam that defines a smooth seam or joint that will not cause the squeegee to jump, and essentially allow printing 360 degrees along the screen at any screen printing speed.

Referring now to the drawings, a piece or sheet of rigidized metal woven screen material 15 is shown in FIG. 1. The sheet is chosen for preparation of a cylindrical screen of a mesh desired for a particular printing application and a size that will provide the screen diameter desired for a given machine. The screen material is carefully and precisely cut squarely and along the edges to be welded so that the edges are straight and square with the other sides. Because the screen material is woven, it may be cut at 90 degrees to the threads or filaments or on a bias from as low as three degrees to as high as 45 degrees, all depending on the mesh count and printing application. It may be cut by any suitable device, such as a sheet-metal shears, a razor blade, a knife with a tapered edge, or otherwise. The screen material is preferably cut on a table having a polyethylene top of at least one-eighth inch thick. Additionally, the screen material is chosen for its mesh count depending upon the printing application desired. For example, the screen material may be of 400, 325, 230, 165, 40, 32 or some other mesh count. The screen is usually of stainless steel with nickel, but may be made of other materials. The thread size will vary from 0.001 to 0.008 inch. The size of the screen material chosen will vary depending upon the diameter and length of the screen desired for a particular printing press. So, the first steps in the method of making a rigidized woven metal screen according to the invention are in making and/or choosing a particular sheet or piece of screen material with a desired mesh size and cutting the screen material precisely to a size that will produce a screen of predetermined size.

Next, the screen material is shaped cylindrically so that end edges abut or slightly overlap as described below, and mounted on a fixture or support having a fixed electrode of a resistance welder aligned with the edges. The edges are either pushed tightly together so that there is no gap between the edges and the edges somewhat "tent" or so the edges slightly overlap to be in position for welding to provide sufficient metal for the weld. Thereafter, another electrode is run along the edges to weld them together to produce a cylindrical printing screen, as shown in FIGS. 2 and 3 and designated by the numeral 16, having a weld seam 17 indicated by the dash lines.

This type of a seam contrasts with the overlapping seam 18 illustrated in FIG. 4 as prior art where the seam is held together by an adhesive such as an epoxy and defines an interior rough edge 19 that will cause jumping of the squeegee. Further, the screen openings of this overlapping seam are closed by the adhesive so that it is impossible to utilize the seam for printing purposes.

One form of apparatus used for making the butt-welded screen of the invention is shown in FIGS. 5 to 9 and includes an elongated support bar or mandrel 24 suitably extending generally in cantilever fashion from a table or bench 25. The actual length and cross-sectional size will depend upon the length and diameter of printing screens to be made. Further, the cross-sectional shape may be of any desired configuration, as long as it preferably includes a flat surface on the upper side onto which the screen material may be mounted for welding, and is solid enough to maintain the straight edge of the lower electrode carried by the bar. For illustrative purposes, the support bar 24 includes an elongated body 26 which is essentially cylindrical in form and having an upper flatted portion or surface 27. The body 26 is further notched at 28 for purposes of facilitating the mounting on the table or bench 25 and where it will be suitably bolted in place so that the support arm is provided at a working level during the welding process. Depending on the length of the arm, it may be supported at the outer end during welding. The support bar body 26 includes an elongated slot 30 in the upper flatted surface 27 into which is received the lower electrode 33 of a resistance welder 34.

The type of resistance welder that may be used is well known and one of the type that would provide spot-welding of metal as no additional metal is added during the welding process.

The working area of the support arm 24 is that portion which extends from the edge of the table or bench. As seen particularly in FIG. 5, an upper electrode or wand 35 opposes the lower electrode 33 and, when welding the butt seam, the upper electrode is moved along the top side of the screen. Both welding electrodes will be made of copper in the usual manner.

The lower electrode 33 is in the form of an elongated bar on the order of 0.250 inches width that is decreased in size at the upper end to form a tip 38 having a width of about 0.010 to 0.040 inches. One satisfactory width used is about 0.030 inches. It is important that the tip be thin or narrow in order to provide the very narrow butt weld at the adjoining edges of the screen. Inasmuch as the tip will wear due to repeated abrasive cleaning, a plurality of set screws 40 are provided along the support bar engaging the lower edge of the electrode for adjusting the height of the electrode so that the top of the tip 38 is at a level to contact the screen material edges when the screen material is mounted on the support arm. It will be appreciated that the butt seam will be aligned longitudinally with the tip.

The upper electrode 35 is in the form of a blade having a width of about 0.250 inches although it could be of any other width desired but preferably of such a width so that it will easily overlap the butt seam when it is in contact with the screen, as shown particularly in FIG. 8. Further, it is seen in FIGS. 5 and 9 that the end of the upper electrode 35 includes a curved section 35a which will be the portion of the electrode contacting the screen during the welding process. Of course, only point contact of the upper electrode is necessary, and as the upper electrode is drawn longitudinally along the butt seam, the edges of the screen material will be welded together. It will be appreciated that the control of the power to the resistance welder will depend upon the screen material size being welded, as the thread diameter of the screen will vary, depending upon the mesh count of the screen as above noted.

The edges of the screen material are brought tightly together, as shown in FIG. 8, so that they tent slightly to assure the presence of sufficient metal to form the weld. The edges are then held in place on the flat surface 27 by suitable means, as seen in FIG. 6, which includes a plurality of fine pins 43, there being a row on opposite sides of the slot 30 for retaining the screen material in place. The pins would penetrate the mesh openings of the screen material. In FIGS. 7 and 8, another system for holding the screen material is shown where double-stick adhesive tape 44 of the usual type is first applied to the flat surface 27 on opposite sides of the gap or slot 30, and thereafter the screen material is pressed on the top surface of the tape to hold it in place. The tape thus holds the abutting edges of the screen material together, as seen in FIG. 8.

Optionally, a guide 45 including parallel plates of plastic as shown in FIG. 8, may be bolted over the screen material once it is placed on the flat surface of the support bar to further hold it in place and define a slot 45a for guiding the path of the upper electrode 35 as it is moved along the edges forming the seam. However, depending upon the nature of the actual machine constructed, it may not be necessary to use the guide.

Inasmuch as the support bar 26 is made of steel as is the screen material, it is necessary to electrically insulate the screen material from the support bar during the welding operation. Bar 26 may be made of aluminum. This can be easily accomplished by applying an insulating tape 48 over the exterior surface of the support bar body 26 and to the top flat surface 27 where pins are used, as shown in FIG. 6. The tape need not be applied to the flat surface where double-stick tape is used, as it can serve as the insulator. Any suitable insulating tape may be used.

Once the screen material is suitably mounted on the support bar, the weld may be made by drawing the wand over the abutting edges of the screen material.

It will be appreciated that the weld is controlled by several factors in order to achieve the type of weld desired. For example, the pressure of the upper electrode on the screen material and the speed along the seam may be varied. Thus, the amount of electrical current may be varied depending on these factors and the mesh count of the screen. Depending upon conditions, all of which would be evident to a person of ordinary skill in the art of resistance welding, the power to the welding machine may be varied.

In FIG. 9, for illustrative purposes a device is shown for moving the upper electrode 35 along the edges of the screen material. This device includes an elongated rack gear 50 supported at opposite ends by upstanding posts 51 and 52, and having mounted thereon a carriage 53 on which the upper electrode 35 is suitably supported. Also, a motor 54 having a pinion gear 55 in meshing engagement with the rack gear 50 is carried on the carriage 53, whereby operation of the motor 54 drives the carriage 53 and the upper electrode along the rack gear 50 to move the upper electrode along the butt seam of the screen material and effect the welding operation. It will be appreciated that any type of suitable mechanism may be used in order to drive the upper electrode along the butt seam. The use of a pneumatic drive is shown in FIG. 10.

The preferred method of making a printing screen according to the invention includes precisely cutting a sheet of screen material so that when the weld is completed, a predetermined diameter of the cylindrical screen will be obtained. The preferred method of cutting the screen includes cutting the edges to be welded so that one of the edges has a downward curl and the other edge has an upward curl when the two edges are brought together in abutting relation. This cut configuration furnishes the necessary metal to assure a solid weld of the ends of the screen material, and can be obtained by cutting one of the edges with the screen facing down or in one direction and then cutting the other edge with the screen facing up or in the opposite direction, thereby presenting an upward curl on one of the edges and a downward curl on the other edge when the edges are brought together in abutting relation. The edges of the screen are resistance welded together, and therefore no metal is added. Bringing the edges in abutting relation is such that they slightly overlap, thereby providing sufficient metal at the weld area to establish a proper weld.

The sheet of screen material is cut square and accurate as to length on a cutting machine or table which is not shown as it does not form part of the invention. Two different cutting tools may be used depending upon the specific class of screen material to be cut. One of the tools would be like a razor-type blade and the other would be like a blade having a tapered cutting edge. Cutting is always done on a piece of polyethylene or a polyethylene board of an appropriate thickness.

For example, to make a drum screen with a repeat length of 15 inches using 325 mesh screen material, the length of sheet material is cut at 15.008 inches. The threads of the 325 and 400 mesh screen are about 0.001 inch or 1 mill in diameter and are spaced apart about 0.003 inch. One end of the sheet is cut face up and the other is cut face down so that the curved edge or curls can be formed to produce the desired overlap for the welding operation. Thus, the sheet has an upward curl on one edge and a downward curl on the other edge. The sheet of screen material in this example is cut 0.008 inches longer than the repeat length, but it may be cut even slightly longer so that about a two thread thickness overlap exists or two threads in from each edge overlap when the edges to be welded are abutted together.

Following the cutting of the sheet of screen material, the sheet is transferred to the welding table 50 and accurately punched at each corner by a punch, with the punch center being 0.254 inch from the edges to be welded and about 0.125 inch from the side edges. The punch hole may be about one-eighth inch in diameter. After the sheet of material has been cut and punched, it is then placed on the welding bar mandrel with the punched holes engaging pins and the overlapping curls being aligned with the stationary electrode on the welding bar mandrel. The screen material is then clamped in place on the mandrel, after which a wand or upper electrode is guidably moved along the overlapping edges of the screen material to produce the weld. An air cylinder drives the welding wand along the seam formed by the edges of the screen material during the welding process. The welding may require one or more passes depending upon the screen material chosen for making the screen. It is important that the edges to be welded together are slightly overlapped one-and-one-half to two threads to provide the extra metal from the wire to obtain a good weld. When the welding process melts the metal threads, it fills the thread gaps and jams the threads together.

Following the completion of the weld, the welded screen is removed from the welding mandrel bar and placed on a round bar about two inches in diameter. The seam is then rolled with a hard roller to smooth out pips created by the weld. Finally, a narrow coat of epoxy or a film-forming water-based resin of about one-sixteenth of an inch may be applied over the outside surface of the weld at the seam which can serve to fill or close small weld holes that may be created. Further, the epoxy or resin creates a smooth surface to ease the squeegee across the weld. The application of epoxy or resin will not affect the smooth passage of the squeegee across the weld seam on the inside surface of the screen.

A more detailed structure of the welding table and its parts is illustrated in FIGS. 10 to 16. The welding table, generally designated by the numeral 50, includes a screen material punch area 52 with a punch 52a and a welding area 54. Following the precise cutting of a sheet of screen material, the sheet is brought to the punch area so that holes can be punched into the corners to assist in mounting the screen on the welding mandrel. The location and size of the holes have already been identified above.

The welding area includes a welding arm or mandrel 56 having a base arm 57 of steel cantileverly supported from the table 50 so that it extends away from one edge of the table. Supported on the arm 57 are elongated plastic blocks 58 and 59 between which the lower copper electrode 60 is held in place. The electrode 60 includes a narrow tip 61 at the upper end which extends the length of the welding arm and on which the edges of the screen material are placed during the welding operation. The plastic blocks 58 and 59 extend the length of the welding arm and define a substantially flat surface on which the screen material is supported. Elongated passageways or slits 63 and 64 are provided in the blocks 58 and 59 at opposite sides of the lower electrode tip 61, and together with holes 63a and b and 64a and b are connected to a suitable vacuum pressure. The vacuum slits and holes initially hold the screen material edges and adjacent areas of the screen material 65 to the welding mandrel prior to application of the clamp assembly 75. As seen in FIGS. 12, 13 and 15, the edges of the screen material to be welded together are provided respectively with an upward curl 65a and a downward curl 65b wherein the downward curl overlaps the upward curl in a manner substantially illustrated and seen most clearly in FIG. 13 so that sufficient metal is present at the weld area to properly define the weld, as above explained.

When the screen material is initially formed cylindrically and placed in position on the welding mandrel, it is supported at its lower side by a cantileverly extending shelf 68 carried by the table 50. The shelf assists in preventing the screen from drooping excessively and straining the area of the seam during welding.

Once the screen is placed in position on the mandrel so that the edges to be welded together are overlapped, as illustrated in FIG. 13, and held in position by the vacuum source, the screen is further secured in place. Further, as the screen is initially placed on the mandrel, the punched corners are mounted on the pins held by the mandrel to precisely position the screen edges together to produce the desired screen diameter and size. Pins 70 and 71 are permanently fixed near the outer end of the mandrel, as seen in FIG. 11. Inasmuch as the mandrel is capable of handling screens of different lengths, such as 12 to 30 inches in length, a movable pin block 72 is disposed at the inner end of the mandrel and which includes pins 73 and 74. The position of the movable pin block 72 may be adjusted so that the pins 73 and 74 align with and receive the punched holes at the inner end of the screen material.

The screen is locked in place on the mandrel by a clamp bar and guide assembly 75 which includes a plate 76 of insulating material such as polyethylene having a slot 77 through which the welding wand 84 can project and be guided over the seam. A resilient strip 76a is suitably attached to the plate 76 at each side of the slot 77 to enhance gripping the screen material. For example, the strip may be of any cross-sectional shape, such as a round vinyl covered foam material, which becomes flattened upon clamping of the assembly 75, as seen in FIG. 15, such that the strip enhances the gripping of the screen material. Right-angle reinforcing bars 78 and 79 of metal or other suitable material are bolted to the plate 76, as seen in FIGS. 10 and 15. The metal bars 78 and 79 include horizontally extending legs 78a and 79a and vertically extending legs 78b and 79b. The vertically extending legs are spaced apart so that the wand 84 will not contact the bars 78 and 79 during movement of the wand over the seam.

Looking at the side of the upper electrode or wand 84, the shape of the screen-engaging end or the lower end of the wand is curved or essentially circular, as shown at 84a in FIG. 16. This shape is important from the standpoint of smoothly contacting the screen material during movement along the seam in either direction.

The wand 84, as seen in FIGS. 10 and 16, is mounted vertically and carried on a carriage 87 movable along a support arm 88 cantileverly mounted on a post 89 extending upwardly from the table 50. The arm 88 carries a pneumatic cylinder 92 suitably connected to the carriage 87 for reciprocably driving the carriage along the support arm. The support arm is parallel mounted relative to the welding mandrel 56 and maintained in parallel relation at the outer end by means of a clamp 95.

The clamp 95 includes a vertically extending bar 96 having a pair of inwardly extending jaws 97 and 98. The jaw 97 bears on the upper side of the insulating plate 76 of the clamp assembly 75 to lock it onto the welding mandrel and a screw-threaded bolt 99 is received by the lower jaw 98 and includes a clamping plate that engages the bottom side of the welding mandrel. The upper end of the vertically extending bar 96 includes an inwardly extending arm 100, the inner end of which includes a cross bar 101 having a slot 102 for receiving an end lug 103 on the carriage support arm 92. The inner end of the guide assembly 75 is received by an inverted U-shaped bar 106 that is connected to the welding bar arm 57. It will be appreciated that once the screen has been subjected to the welding operation so that it is in cylindrical form, it is necessary to remove the clamp 95 to release the guide assembly 75 and allow the screen to be slipped off the free end of the welding mandrel 56. Thereafter, the clamp is replaced for the next welding operation.

When the welded screen is removed from the welding mandrel, it is transferred to a cylindrical bar 110 cantileverly supported from the table 50, as seen in FIG. 10. The welded seam is placed in contact with the bar 110 and a hard roller is moved along the welded seam to remove the pips that may be caused during the welding operation and thereby smooth out the welded seam. As added security to the integrity of the screen and also for the purpose of filling small weld holes that may occur on some types of screen wire, a very narrow coat of epoxy or a film-forming water-based resin of about one-sixteenth of an inch wide is applied over the outside surface of the screen along the weld seam. This completes the procedure for making the screen, thereby producing a screen having an accurate repeat length with a smooth weld that enhances the ability to increase printing speed. The screen of the invention is particularly important in the label printing business which requires a space of only one-eighth inch between labels.

Following each weld and prior to a subsequent welding operation, the anvil section 61 of the lower electrode must be cleaned with emery cloth. Similarly, the lower end of the welding wand 84 which contacts the printing screen material seam during the welding operation must be cleaned after each welding operation. This is accomplished by removing the welding wand from the carriage 87 and working it against the emery cloth 112 which is mounted at one corner of the table 50, as seen in FIG. 10. The emery cloth 112 is set at a predetermined looseness so that the shape of the curved end of the welding wand may be maintained uniformly by moving the end of the wand over the emery cloth under pressure. The weld corrosion is easily removed without changing the shape of the tip. As above mentioned, this wand is made of copper with a thickness of 0.250 inches and a width of 0.750 inches.

When the clamp assembly 75 is applied over the screen material that has been pinned in place and held by the vacuum slit formed along the mandrel, the assembly 75 is clamped in place over the screen material with considerable pressure by inserting the inner end within the opening provided by the bar 106 and mounting outer clamp 95.

The welding wand 84 is shown in a vertical position, and it can be raised or dropped by an air pressure cylinder 114. The weight of the wand against the seam is adjusted as some screen materials need more pressure than others. The pressure should be such that the edges to be welded are pressured against the lower electrode such as to produce a proper weld. Most welds are completed where the welding wand moves first from one end of the screen to the other end of the screen along the seam and back again across the seam. Some welds can be completed with a single pass over the weld seam and others may require multiple passes.

The power of the resistance welder may be controlled by using a large rheostat, such as with 15-25 ohms resistance. The power can be increased or decreased as determined by an experienced welder and as would be dependent upon the thickness of the wire being welded.

In view of the foregoing, it will be appreciated that a new and improved cylindrical printing screen of rigidized, woven metal screen is provided in order to not only accommodate higher printing speeds but also to enlarge the image area for printing by eliminating the rough area heretofore known on printing screens. Further, the present invention provides a method and apparatus for making such a screen having a true butt weld.

It will be understood that modifications and variations may be effected without departing from the scope of the novel concepts of the present invention, but it is understood that this application is to be limited only by the scope of the appended claims.

The invention is hereby claimed as follows:

1. A method of making a cylindrical printing screen for a rotary screen press from a rectangular sheet of woven metal screen material comprising the steps of, cutting the screen material to form a sheet for making a screen of predetermined size, forming the sheet into a generally cylindrical shape by bringing two edges of the sheet together into abutting relation such that sufficient metal is present to form a butt seam with resistance welding, attaching the sheet to a fixed support bar holding a fixed welding electrode along the abutting edges so that one side of the butt seam is in alignment therealong and in contact with said electrode, wherein the electrode on said bar has a width of 0.010 to 0.040 inches, and applying an electrode to the other side of the butt seam and moving the electrode along the seam to resistance weld the edges together and form a completed printing screen.

2. The method of claim 1, wherein the step of cutting the screen material includes cutting one edge to be welded face down and the other edge to be welded face up so that the edges have opposing curved portions when brought together for welding, and the step of abutting the edges includes slightly overlapping the curved portions to assure sufficient metal will be present to form the welded seam.

3. The method of claim 1, wherein the step of forming the sheet into a generally cylindrical form includes bringing the edges together in tenting relationship to provide sufficient metal for the weld.

4. A method of making a rotary printing screen from a substantially rectangular sheet of woven rigidized wire mesh screen material by making a welded seam with a resistance welder wherein the welder includes a fixed lower electrode and a movable upper electrode, said method comprising the steps of cutting the screen material into a sheet to form a predetermined size to form a screen, forming the sheet of screen material into a generally cylindrical shape to abut two edges together, mounting the screen material onto a support bar having the lower electrode in the form of an elongated welding electrode, wherein the electrode is received in a slot on the bar and includes a tip having a width of 0.010 to 0.040 inches, aligning the lower sides of the abutting edges along the tip, applying the upper electrode to the upper sides of the abutting edges to weld the edges together and form a butt weld seam and a completed rotary printing screen.

5. The method of claim 4, wherein the step of cutting the screen material includes cutting one edge to be welded face down and the other edge to be welded face up so that the edges have opposing curved portions or curls when brought together for welding, and the step of abutting the edges includes slightly overlapping the curved portions or curls to assure sufficient metal will be present to form the welded seam.

6. The method of claim 4, wherein the upper electrode is in the form of a blade about 0.250 inches thick having the tip at one edge.

7. The method of claim 4, wherein the screen material is in the range of 400 to 32 mesh having threads of from 0.001 to 0.008 inch in diameter.

8. The method of claim 4, wherein the mounting step includes applying double-stick adhesive tape to the support bar and pressing the screen material onto the tape.

9. The method of claim 4, wherein the mounting step includes providing pins on the support bar for receiving the screen material and holding the edges together.

10. The method of claim 4, which further comprises the step of electrically insulating the screen material from the support bar.

11. The method of claim 4, wherein the step of abutting the edges includes tenting the edges to assure sufficient metal will be present to form the welded seam.

12. Apparatus for butt welding woven metal printing screen material to define a cylindrical printing screen for a rotary screen press, said apparatus comprising a resistance welder having a pair of electrodes, an elongated support bar having an upper substantially flat surface, an elongated slot in the flat surface for receiving the lower one of the electrodes and holding the electrode stationary, said electrode in the bar having a tip of 0.010 to 0.040 inch width, means on the bar for holding the abutting edges of a cylindrically formed sheet of woven screen material together on the support arm so the abutting edges have sufficient metal to form the butt weld aligned with said electrode tip, means electrically insulating the screen material from the support bar, means supporting the upper one of the electrodes above the screen material and opposite the bar electrode and driving the electrode along the edges to resistance weld the edges together and form a butt weld, said upper electrode being substantially wider than said tip.

13. The apparatus of claim 12, wherein said support bar includes means to adjust the electrode for wear.

14. The apparatus of claim 13, wherein the upper side of the support bar is flat and slotted to receive the lower electrode.

15. The apparatus of claim 12, wherein said holding means includes double-stick adhesive tape applied to the flat surface of the support bar and onto which the screen material is attached.

16. The apparatus of claim 12, wherein said holding means includes pins on the support bar for receiving the edges of the screen material.

17. The apparatus of claim 12, wherein said woven screen material is rigidized.

18. The apparatus of claim 17, wherein the screen is in the range of 400 to 32 mesh having threads of from 0.001 to 0.008 inch in diameter.

19. The apparatus of claim 12, wherein the tip width is 0.030 inch.

20. The apparatus of claim 12, wherein a clamp is secured to the support bar to hold the edges of the screen material together and to guide the path of movement of the upper electrode along the edges of the screen material.

* * * * *